(12) United States Patent
Lazaratos

(10) Patent No.: US 6,516,275 B2
(45) Date of Patent: Feb. 4, 2003

(54) METHOD FOR SPECTRAL BALANCING OF NEAR- AND FAR-OFFSET SEISMIC DATA

(75) Inventor: Spyridon K. Lazaratos, Spring, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/074,388

(22) Filed: Feb. 12, 2002

(65) Prior Publication Data

US 2002/0141287 A1 Oct. 3, 2002

Related U.S. Application Data

(60) Provisional application No. 60/268,492, filed on Feb. 13, 2001.

(51) Int. Cl.$^7$ .............................................. G06F 19/00
(52) U.S. Cl. .............................................. 702/17; 702/5
(58) Field of Search ............................... 702/17, 16, 14, 702/9, 15; 367/21, 52, 38, 47, 31; 703/5

(56) References Cited

U.S. PATENT DOCUMENTS

| | | | | |
|---|---|---|---|---|
| 4,353,121 A | | 10/1982 | Ray et al. ....................... | 367/21 |
| 4,995,007 A | | 2/1991 | Corcoran et al. ............. | 367/52 |
| 5,258,960 A | * | 11/1993 | Swan ........................... | 367/38 |
| 5,297,108 A | * | 3/1994 | Swan ........................... | 367/38 |
| 5,870,691 A | | 2/1999 | Partyka et al. ................ | 702/16 |
| 6,058,073 A | * | 5/2000 | VerWest ...................... | 367/31 |
| 6,128,581 A | * | 10/2000 | Zhang .......................... | 702/18 |
| 6,131,071 A | | 10/2000 | Partyka et al. ................ | 702/16 |
| 6,219,621 B1 | * | 4/2001 | Hornbostel .................. | 702/16 |

OTHER PUBLICATIONS

Duren, R. E., 1991, "Seismic Range Equation", Geophysics, 56, pp. 1015–1026.

Swan, H. W., 1997, "Removal of Offset–Dependent Tuning in AVO Analysis", Expanded Abstracts of 67th Annual, Int. SEG Mtg., pp. 175–178.

Dong, W., 1999, "AVO Detectability Against Tuning and Stretching Artifacts", Geophysics, 64, pp. 494–503.

(List continued on next page.)

Primary Examiner—Edward Lefkowitz
Assistant Examiner—Victor J. Taylor
(74) Attorney, Agent, or Firm—Charles R. Schweppe

(57) ABSTRACT

A method for spectral balancing of near- and far-offset seismic data, whereby velocity and offsets are determined for the seismic data. First, an NMO stretch compensation filter is created by the following steps. A frequency spectrum of the near-offset seismic data is estimated and a stretch factor $\beta$ is calculated for the frequency spectrum, using the velocity and the offsets. A stretched frequency spectrum of near-offset seismic data is calculated, based on the stretch factor $\beta$. The frequency spectrum of near-offset seismic data is divided by the stretched frequency spectrum of near-offset seismic data, generating a first frequency response filter. High frequency gain is limited in the first frequency response filter, generating a first gain-limited filter. The first gain-limited filter is convolved with a low pass filter, generating the NMO stretch compensation filter. Then the NMO stretch compensation filter is applied to the seismic data. Second, a relative Q compensation filter is created by the following steps. A difference in amplitude loss between the near- and far-offset seismic data is calculated, using the velocity and the offsets. A frequency gain is calculated, based on the difference in amplitude loss. A second frequency response filter is created, based on the frequency gain. High frequency gain is limited in the second frequency response filter, generating a second gain-limited filter. The second gain-limited filter is convolved with a low pass filter, generating the relative Q compensation filter. The relative Q compensation filter is applied to the seismic data.

10 Claims, 17 Drawing Sheets

OTHER PUBLICATIONS

Castoro, A., 1998, "Mapping Reservoir Properties Through Prestack Seismic Attribute Analysis", Ph.D thesis, Research School of Geological and Geophysical Sciences, Birkbeck College, University of London, Chapter 5: Offset Dependent Tuning.

Wapenaar, K., et al., 1996, "Compensating for the Effects of Fine–Layering on AVA (Amplitude vs. Angle)", Extended Abstracts of 58th EAGE Conf., vol. 1, paper No. C035.

Dunkin, J.W. and Levin, F. K., 1973, "Effect of Normal Moveout on a Seismic Pulse", Geophysics, 28, pp. 635–642.

Duren, R. E., 1992, "Range–Equation Weights for AVO", Geophysics, 57, pp. 1203–1208.

O'Connell, R.J. and Budiansky, B., 1978, "Measures of Dissipation in Viscoelastic Media", Geophysics, Res, Lett. 5, pp. 5–8.

* cited by examiner

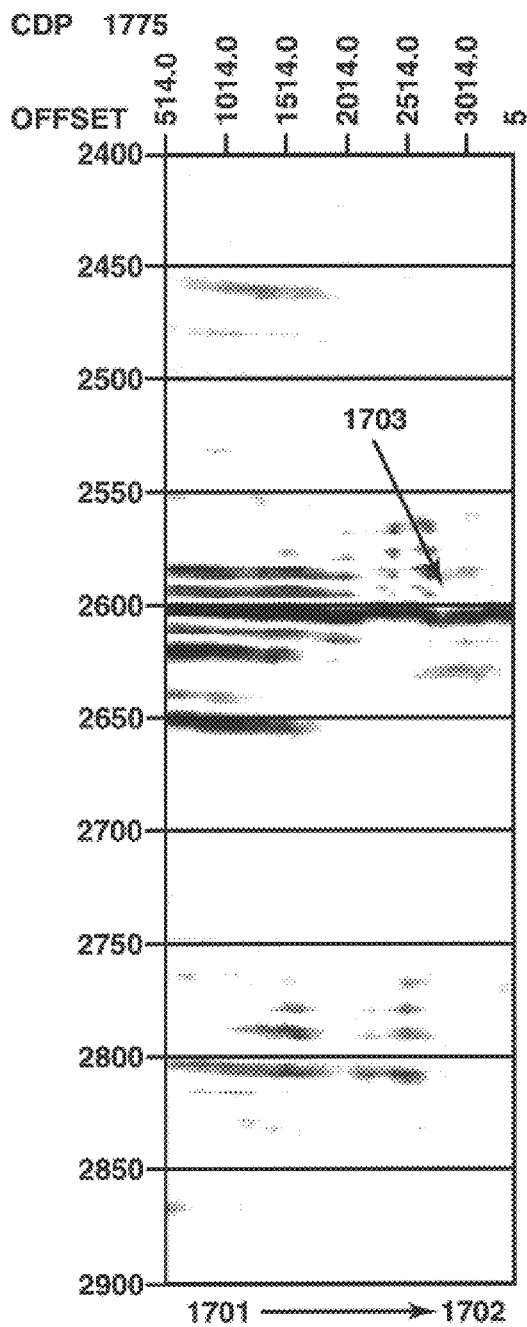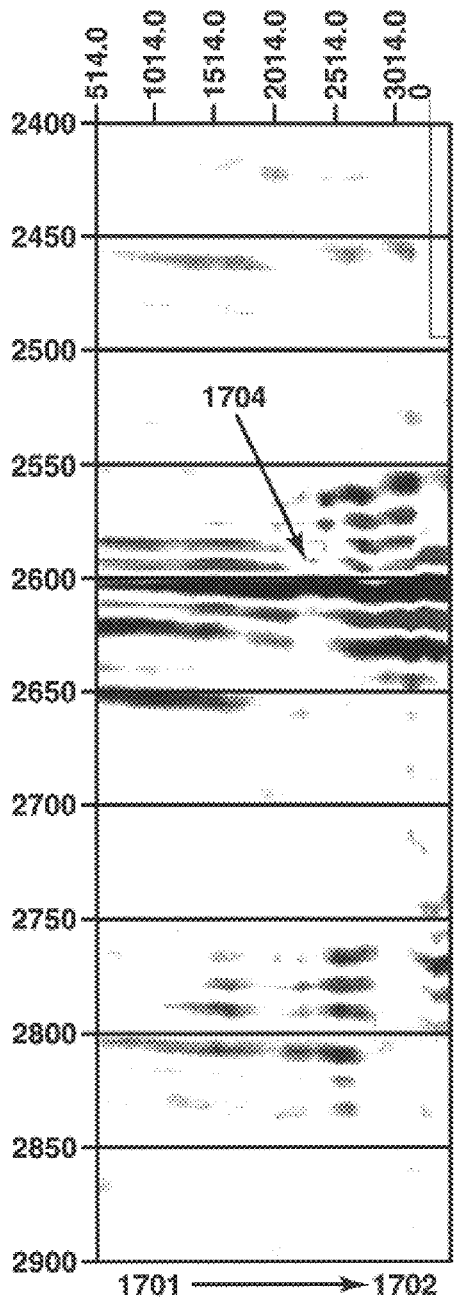
*FIG. 17A*  *FIG. 17B*

METHOD FOR SPECTRAL BALANCING OF NEAR- AND FAR-OFFSET SEISMIC DATA

This application claims the benefit of U.S. Provisional Application No. 60/268,492 filed Feb. 13, 2001.

BACKGROUND OF THE INVENTION

1. Field of the Invention

This invention relates generally to the field of geophysical prospecting and, more particularly, to seismic data processing. Specifically, the invention is a method for spectral balancing of near- and far-offset seismic data.

2. Description of the Related Art

Amplitude versus offset (AVO) is a seismic data analysis method based on studying the variation in the amplitude of reflected waves with changes in the distance (offset) between the seismic source and receiver. The AVO response of the reflection events associated with the boundaries between the reservoir rock and the surrounding sealing materials often depends on the properties of the fluid stored in the reservoir pore space. Because of this property, AVO analysis is often used as a tool for reservoir fluid prediction.

A common difficulty for AVO analysis is that the frequency spectra of near- and far-offset data are different. In general, near-offset sections contain more high-frequency energy than far-offset sections. This variation in frequency content can significantly alter the AVO response, since the interference patterns between adjacent reflection events (for instance the top and bottom of a layer) will be different on the near- and far-offset data. Difference in interference (tuning) can create false AVO anomalies or make valid AVO anomalies disappear. Because of their different frequency spectra, correlating reflection events between near- and far-offset sections is often impossible or ambiguous.

FIG. 1 shows an example of a change in frequency spectra between near- and far-offset sections. The near-offset section 101, on the left half of the figure, contains a larger number of cycles than the far-offset section 102, on the right half of the figure. Analysis of the AVO response of a given cycle is impossible when the cycle is not present in both near- and far-offset sections. FIG. 2 illustrates a similar situation with a Common-Depth-Point (CDP) gather. There are several cycles in the near offsets 201, on the left half of the figure, that get lost, or coalesce with other cycles, in moving along the section towards the far offsets 202, on the right half of the figure. Two areas where cycles are lost are indicted by reference numbers 203 and 204. These examples illustrate the need for a method of balancing the spectra of near- and far-offset data before AVO analysis.

A number of publications have dealt with the different effects that distort AVO measurements. Perhaps the most complete listing of such effects was given by Duren, R. E., 1991, "Seismic range equation", Geophysics, 56, 1015–1026, who developed the seismic range equation to account and correct for the effects of source and receiver array directivity, waveform spreading, and losses due to transmission, interbed multiples and attenuation (Q). Yet Duren ignored the effect of Normal Moveout (NMO) stretch, also known as offset-dependent tuning. The distortion in NMO stretch is caused by the fact that arrival time differences between reflection events change as a function of offset. Since the timing relationships between different events change, the corresponding interference patterns between reflection events also change, and this has a large effect on the reflection amplitudes.

Several authors recognized the significance of NMO stretch on AVO measurements and suggested methods to compensate for it. Three different approaches for correcting the AVO intercept and gradient for the effect of NMO stretch are described by (1) Corcoran, C. T., Leveille, J. P., and Velasco, E. S., 1991, "Method for processing seismic data", U.S. Pat. No. 4,995,007; (2) Swan, H. W., 1997, "Removal of offset-dependent tuning in AVO analysis", Expanded abstracts of 67th Ann. Int. SEG Mtg., 175–178; and (3) Dong, W., 1999, "AVO detectability against tuning and stretching artifacts", Geophysics, 64, 494–503. All three of these approaches rely on a model for the amplitude of the reflect ions as a function of offset, expressed by the equation:

$$S(t,\theta)=A(t)+B(t)\sin^2(\theta).$$

Here S (t, θ) is the amplitude of a reflection at time t (after NMO) for a reflection angle θ, A(t) is a time series usually called the intercept, and B(t) is another time series called the gradient.

AVO analysis is often accomplished by perform in g a leas t-squares fit of the NMO-corrected data and estimating A(t) and B(t), which are further studied to indicate th e presence or absence of hydrocarbons in the layers that generate the reflections. NMO stretch causes significant distortions of the intercept and gradient time series A(t) and B(t). The three authors mentioned above presented different methods for correcting those distorted intercept and gradient series for the effect of NMO stretch. The main shortcoming of the above approaches is that they can only be used after the intercept and gradient have been calculated. Generally, the intercept and gradient calculations are extremely sensitive to small misalignments of the near- and far-offset data, caused by slightly inaccurate NMO velocities. These misalignments produce distortions of A(t) and B(t) that are often much larger than those caused by NMO stretch. Because of this, it is very desirable for practical AVO applications to be able to correct the data for the effect of NMO stretch without having to first estimate the intercept and gradient time series.

Castoro, A., 1998, "Mapping reservoir properties through prestack seismic attribute analysis", Chapter 5: Offset dependent tuning, 130–157, Ph.D. thesis, Research School of Geological and Geophysical Sciences, Birkbeck College, University of London, describes a method for correcting for NMO stretch without first estimating the intercept and gradient time series. Yet, Castoro's approach can only be applied to target zones and not to the whole trace. This is a significant shortcoming, since AVO analysis is often applied to large 3-D seismic cubes as a reconnaissance tool.

Wapenaar, K., Van der Leij, T., Van Geloven, W., Van Wijngaarden, A. J., 1996, "Compensating for the effects of fine-layering on AVA (Amplitude Vs. Angle)", Extended abstracts of 58th EAGE conference, vol.1, paper no. C035, proposes a seismic migration (imaging) algorithm that can correct for the effect of NMO stretch. Yet, typically AVO analysis is performed on data that have already been migrated (imaged) with a variety of migration algorithms. Hence, it is desirable to have an NMO stretch compensation method that is independent of the choice of migration algorithm.

The application of NMO stretch compensation to the data can be detrimental for AVO analysis if it is not accompanied by a compensation for the frequency-dependent losses that also affect the data. This is an additional consideration that is not addressed by any of the previous authors. Therefore, it is desirable that, if NMO stretch compensation is applied, amplitude losses caused by frequency-dependent mechanisms are also compensated for. Such mechanisms tend to affect higher-frequency energy more than lower-frequency energy.

An important frequency-dependent loss mechanism is the absorption of the wave energy by transformation to heat that causes attenuation of the wave amplitudes. Standard absorption-compensation methods attempt to compensate for all absorption losses since the waves entered the subsurface. Such methods often have detrimental effects on data quality, because they amplify high-frequency noise. It is thus desirable to have an approach for absorption compensation for AVO applications that is applicable to the whole trace and corrects for the relative amplitude loss between the near- and far-offset data.

Thus, there exists a need for a method to compensate for the effects of both NMO stretch and frequency-dependent loss mechanisms such as absorption on seismic data for AVO analysis that can be applied to whole traces, that is independent of the choice of migration algorithm, that does not require estimates of the intercept and gradient time series, and that corrects for the relative amplitude loss between the near- and far-offset data.

SUMMARY OF THE INVENTION

The invention is a method for spectral balancing of near- and far-offset seismic data. Initially, velocity and offsets are determined for the seismic data. Then two compensation filters are created. First, an NMO stretch compensation filter is created by the following steps. A frequency spectrum of the near-offset seismic data is estimated and a stretch factor $\beta$ is calculated for the frequency spectrum, using the velocity and the offsets. A stretched frequency spectrum of near-offset seismic data is calculated, based on the stretch factor $\beta$. The frequency spectrum of near-offset seismic data is divided by the stretched frequency spectrum of near-offset seismic data, generating a first frequency response filter. High frequency gain is limited in the first frequency response filter, generating a first gain-limited filter. The first gain-limited filter is convolved with a low pass filter, generating the NMO stretch compensation filter. Then the NMO stretch compensation filter is applied to the seismic data. Second, a relative Q compensation filter is created by the following steps. A difference in amplitude loss between the near- and far-offset seismic data is calculated, using the velocity and the offsets. A frequency gain is calculated, based on the difference in amplitude loss. A second frequency response filter is created, based on the frequency gain. High frequency gain is limited in the second frequency response filter, generating a second gain-limited filter. The second gain-limited filter is convolved with a low pass filter, generating the relative Q compensation filter. The relative Q compensation filter is applied to the seismic data.

BRIEF DESCRIPTION OF THE DRAWINGS

The present invention and its advantages may be more easily understood by reference to the following detailed description and the attached drawings in which:

FIG. 17a is a CDP gather before Q compensation; and

FIG. 17b is the CDP gather of FIG. 17a after Q compensation.

Changes, modifications, alternatives, and equivalents in the specifically described embodiments can be carried out without departing from the scope of the invention, which is intended to be limited only by the scope of the appended claims.

DETAILED DESCRIPTION OF THE INVENTION

The invention is a method for deterministic spectral balancing of near- and far-offset seismic data. It is based on recognition of the two facts that NMO stretch is the predominant effect causing the difference in the frequency spectra of near- and far-offset data, but that frequency-dependent loss mechanisms such as absorption must also be compensated for. Unlike previously proposed methods, the method of NMO stretch compensation presented here can be applied directly to the data, without the need for a previous calculation of the intercept and gradient time series. In addition, it is applicable to the whole trace, not just to specific zones. It is also independent of the migration algorithm used to image the data.

In summary, the method disclosed here consists of two steps: (1) compensation for NMO stretch, and (2) compensation for frequency-dependent losses, mainly absorption. These two steps will be discussed in turn.

1. COMPENSATION FOR NORMAL MOVEOUT (NMO) STRETCH

Arrival time differences between reflection events generally decrease with increasing offset. Consequently, when reflection events are lined-up at their zero-offset times, using Normal-Moveout (NMO) correction, the events at the far-offset traces are stretched and appear to be of lower frequency than those at the near-offset traces.

Figure 3:
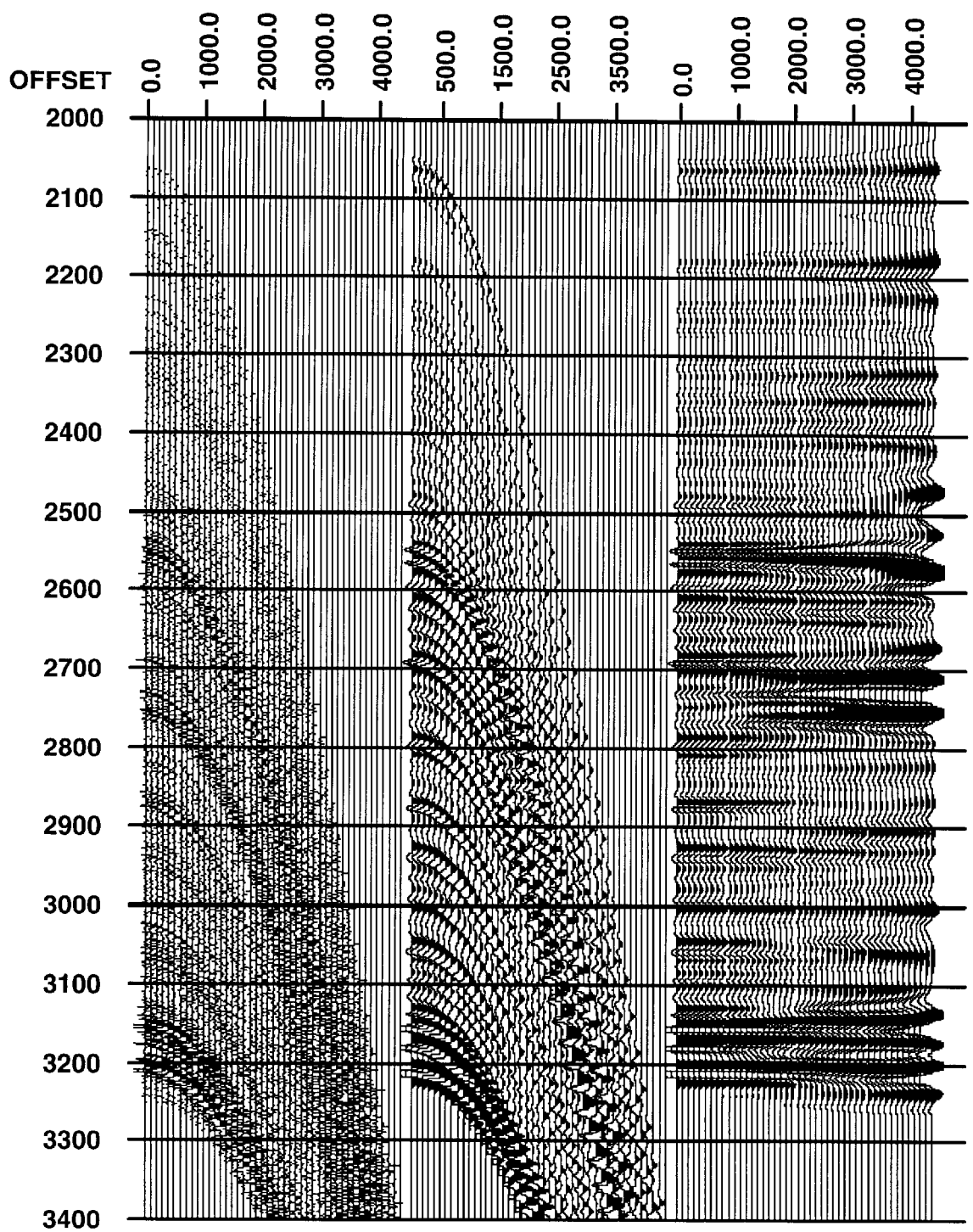
FIG. 3a is an illustration of reflectivity spikes for a CDP gather.
FIG. 3b is an illustration of the reflectivity spikes of FIG. 3a after convolution with a wavelet.
FIG. 3c is an illustration of the convolved reflectivity spikes of FIG. 3b after NMO correction.

FIGS. 3a through 3c are an illustration of the effect of NMO stretch on a CDP gather. FIG. 3a shows a set of reflectivity spikes derived from a well log. The collection of traces corresponds to a CDP gather. The size of a reflectivity spike is representative of the value of the reflection coefficient for a given layer boundary and it varies with offset. The spikes are posted at the corresponding arrival times at which the reflections would be recorded. As can be seen from FIG. 3a, the distance between spikes corresponding to successive events decreases with increasing offset. It is well established that a good approximation of the seismic response generated from a set of reflectors can be achieved by the convolution of the series of reflectivity spikes with the seismic wavelet. The result of this convolution is shown in FIG. 3b, which represents the seismic data that would be recorded for this set of reflectors. The result of NMO correction applied to this gather is shown in FIG. 3c. Notice that the events at the far-offset traces are stretched and appear to be of lower frequency than those at the near traces.

The amount of NMO stretch is expressed by a stretch factor $\beta$. Consider an event at a zero-offset time t0. A common approximation, on which the NMO correction is based, is to assume that the event arrival time t at an offset x is well described by a hyperbolic equation as follows:

$$t^2 = t_0^2 + [x/v(t_0)]^2, \quad (1)$$

where v is the NMO velocity function. Incrementing the zero-offset time by a small amount $dt_0$, produces an increment dt of the arrival time t, such that $$(t+dt)^2 = (t_0+dt_0)^2 + [x/v(t_0+dt_0)]^2. \quad (2)$$

The NMO stretch factor $\beta$ is simply defined by the following ratio $$\beta = dt_0/dt. \quad (3)$$

Notice that the value of $\beta$ is different for different zero-offset time $t_0$ and offsets x. On the CDP gather of FIG. 3, offset changes in the horizontal direction, time changes in the vertical direction and, in general, the NMO stretch factor $\beta$ has a different value for every point in the gather.

Figure 4:
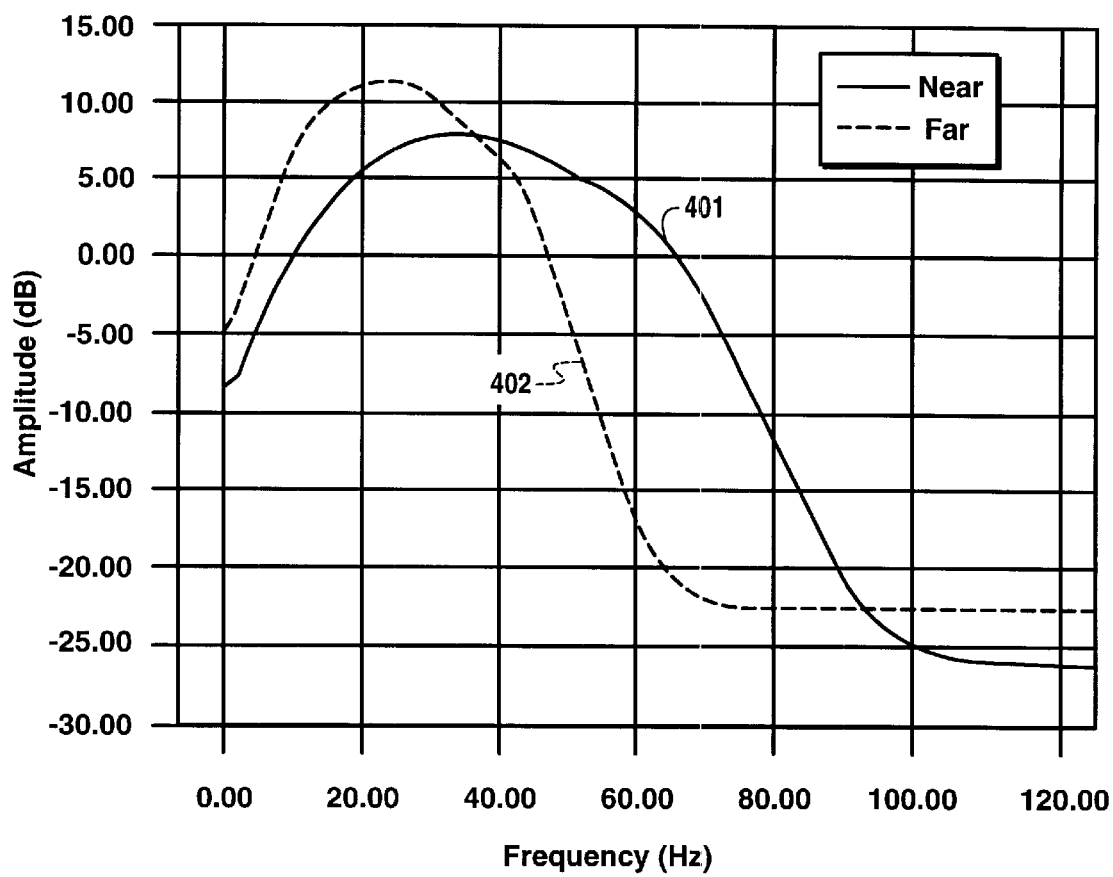
FIG. 4 is an illustration of the effect of NMO stretch on the frequency spectrum of a seismic wavelet.

Dunkin and Levin (1973) Dunkin, J. W., and Levin, F. K., 1973, Effect of normal moveout on a seismic pulse, Geophysics, 28, 635–642, studied the effect of NMO stretch on the frequency spectrum of the seismic wavelet and showed that the stretch in the time domain corresponds to a compression in the frequency domain. FIG. 4 illustrates the effect of NMO stretch on the frequency spectrum of a seismic wavelet. If $S_0$ (f) is the value of the frequency spectrum of the unstretched wavelet for frequency f, then the spectrum $S_x$ (f) of the stretched wavelet for a stretch factor $\beta$ can be given by:

$$S_x(f) = \beta S_0(\beta f). \quad (4)$$

The net effect is that, compared to the spectrum of the near-offset data 401, the spectrum of the far-offset data 402 becomes richer in low-frequency energy and poorer in high-frequency energy. Note that, since the stretch factor $\beta$ changes continuously as a function of time and offset, this relationship is only valid locally, over a very small portion of a trace within a CDP gather.

The method for compensation for NMO stretch as disclosed here is based on the following two fundamental ideas. First, the relationship between the stretched and unstretched wavelet spectra is known. It is Equation (4). Therefore a linear filter can be designed that will transform the stretched wavelet into its unstretched counterpart. Second, Equation (4) is only valid locally, since the stretch factor $\beta$ changes with time and offset. Thus, a mechanism needs to be devised such that any compensation method based on Equation (4) can be applied to an entire trace of seismic data.

Figure 5A:
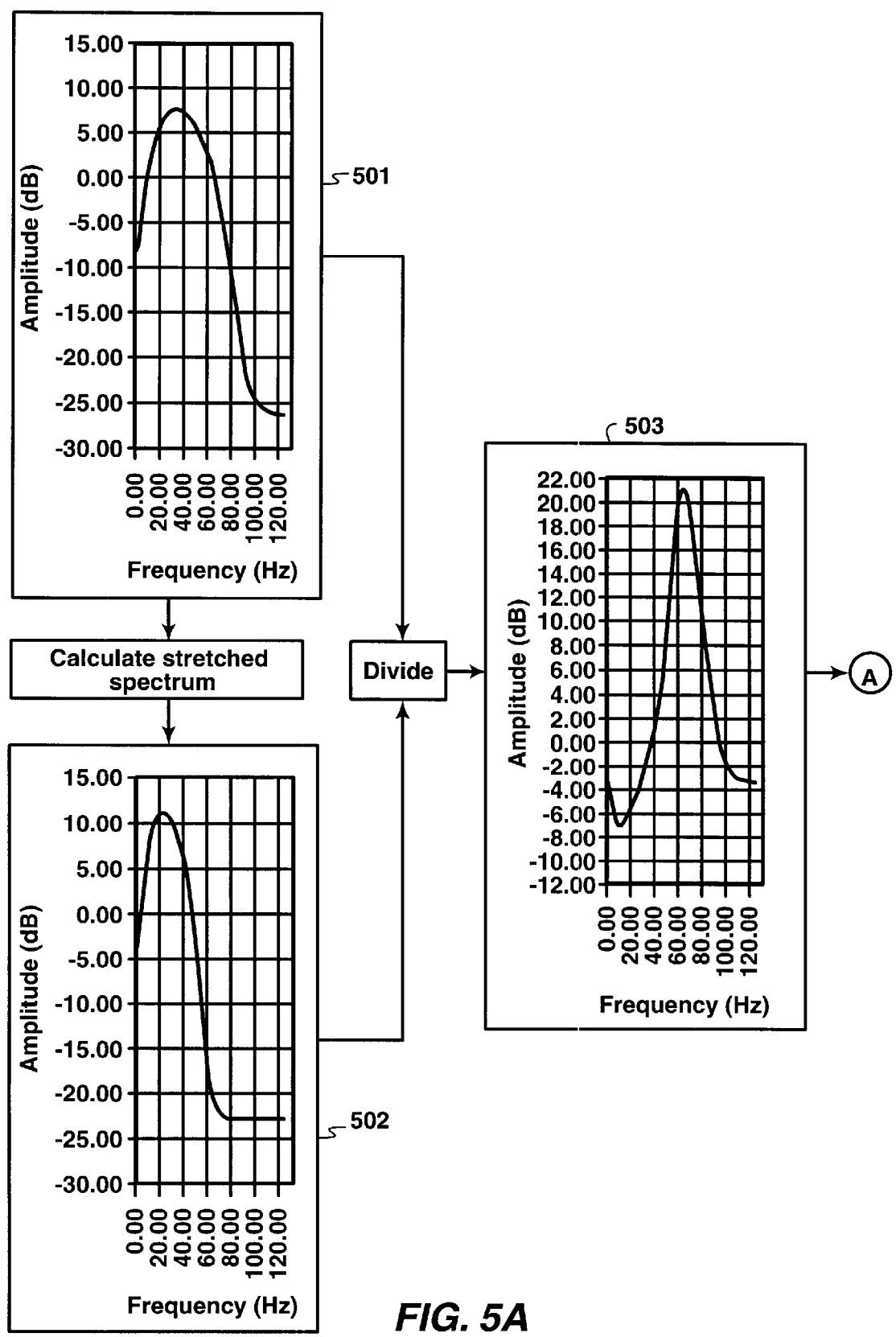
FIG. 5 is a flow chart illustrating the method for deriving an NMO stretch compensation filter.
Figure 5B:
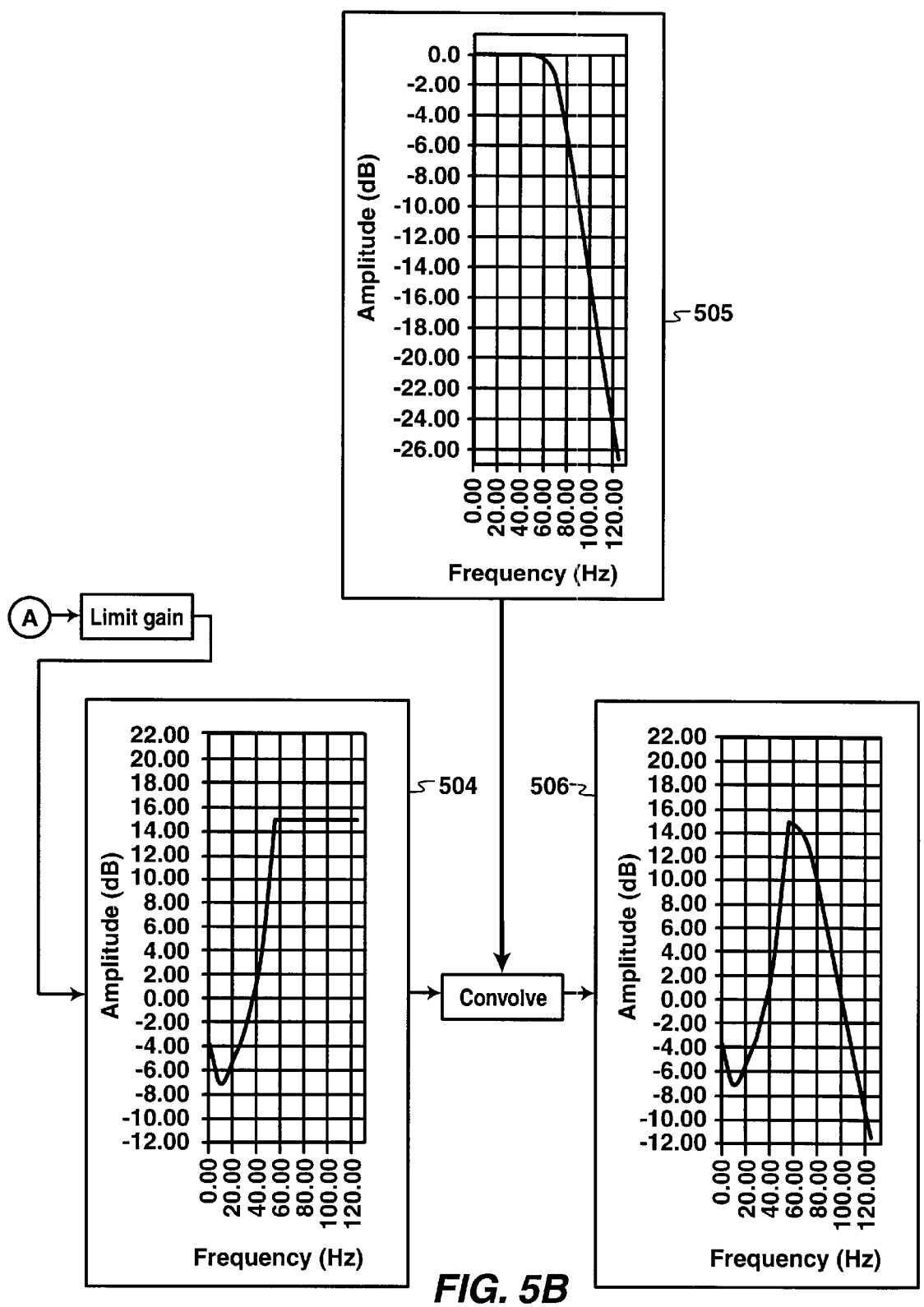

FIG. 5 is a flow chart illustrating the method for deriving an NMO stretch compensation filter. It shows how to derive the frequency response of a linear filter that, if applied to the stretched wavelet, will transform it to an approximation of its unstretched equivalent. The process starts with an estimate of the near-offset unstretched wavelet spectrum 501 (upper left corner). Given the stretch factor $\beta$, the effect of NMO stretch on this spectrum can be calculated according to Equation (4) to produce the stretched wavelet spectrum 502 shown in the lower left corner. Dividing the unstretched spectrum by the stretched spectrum produces the theoretical frequency response 503 for a filter that will transform the stretched wavelet to the unstretched one. Since the stretched spectrum is richer in low frequencies and poorer in high frequencies, this filter will apply a negative gain for the low frequencies and a positive gain for the high frequencies.

In general, this exact theoretical filter is not recommended for real seismic data applications, because it often implies a very large amount of gain for the high-frequency data. Since the signal-to-noise ratio of seismic data tends to be poor for high frequencies, application of the theoretical filter tends to amplify the high-frequency noise and to produce unreliable results. For this reason, it is recommended that the gain of the theoretical response be limited to ensure that the amplification applied by the filter to the high-frequency data does not exceed an acceptable level. This generates a gain-limited filter response 504. The optimum limit level depends on the signal-to-noise ratio of the data and can be determined through iterative application to a small portion of the data. Finally, the gain-limited filter response 504 is convolved with a low pass filter 505, to ensure that the filter's gain decreases back to small values in the high-frequency range. This generates the final filter response 506.

Figure 6:
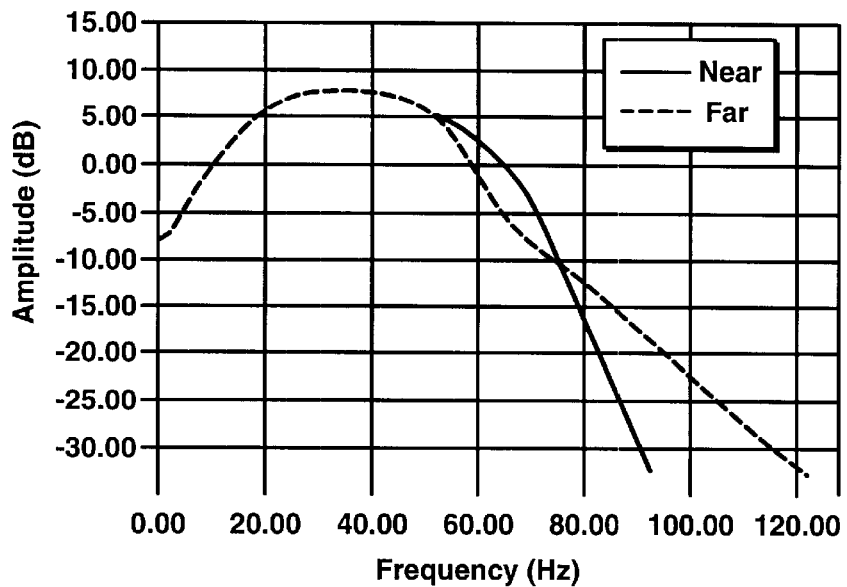
FIG. 6 is a comparison of the near- and far-offset wavelet spectra before and after application of the NMO stretch compensation filter.

FIG. 6 shows the near- and far-offset wavelet spectra shown in FIG. 4 after application of the final NMO stretch compensation filter 506 described in FIG. 5. After stretch compensation the spectra are perfectly matched up to the frequency for which the theoretical filter response was used. For larger frequencies both spectra decay, but there are still differences. In practice these differences are often not very significant, since the signal level at the higher frequencies where these differences occur is considerably lower than the level at the central part of the frequency range where the near- and far-offset spectra are well matched. When these differences at larger frequencies are considered significant, a low pass filter can be applied to both near- and far-offset spectra to reduce them to an acceptable level.

Figure 7:
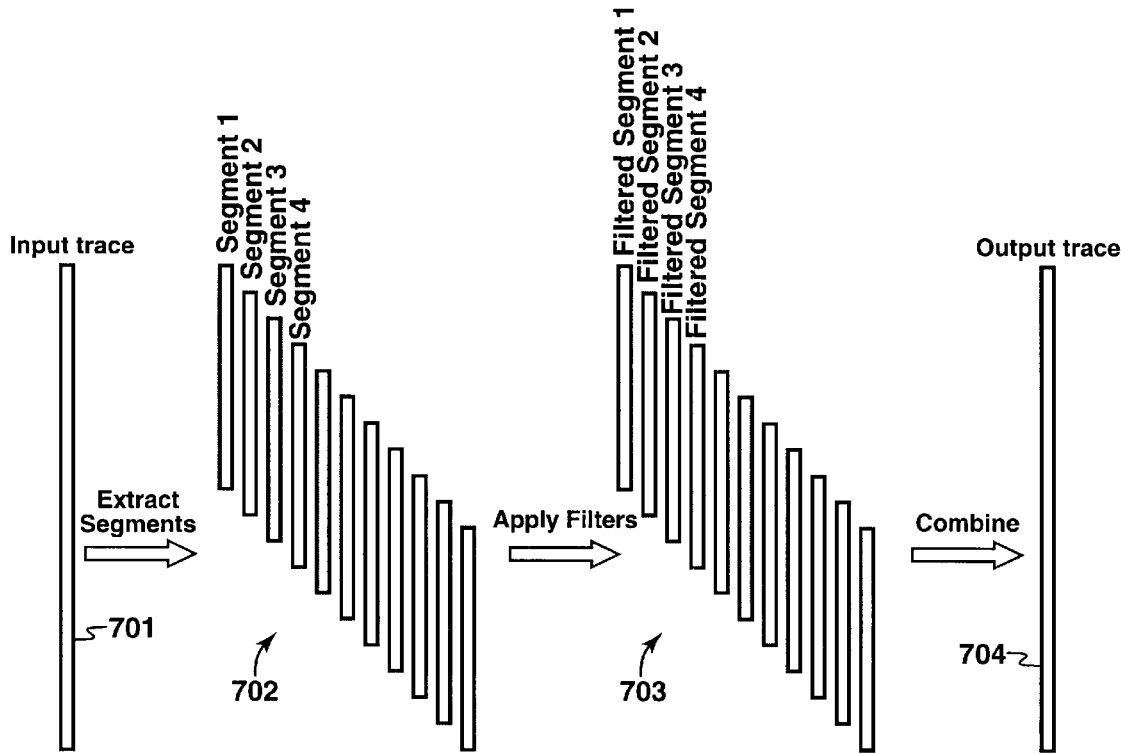
FIG. 7 is a schematic illustrating the application of the NMO stretch compensation filter to an input seismic trace.
Figure 8:
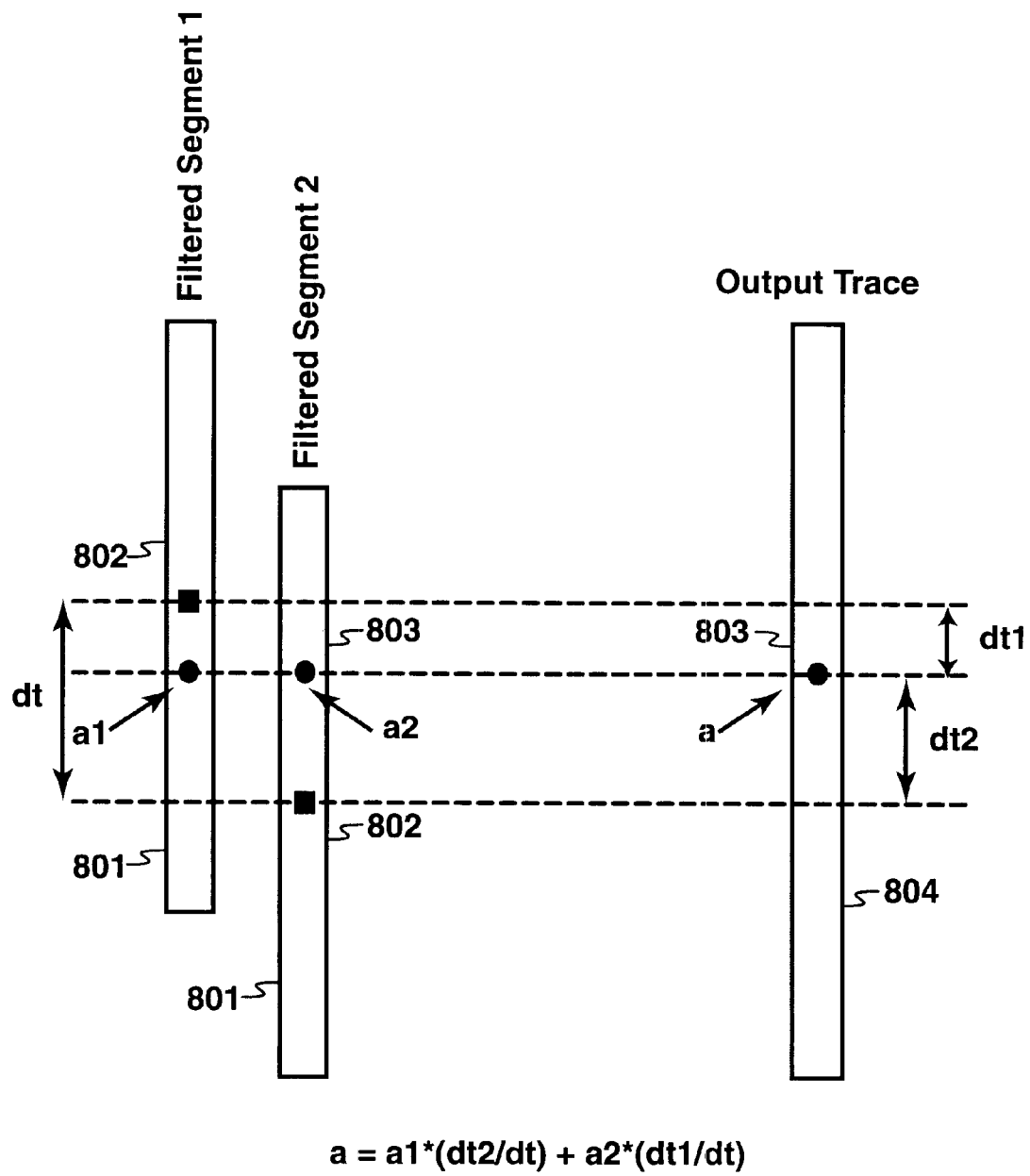
FIG. 8 is a schematic illustrating the combination of filtered segments to form an output seismic trace.
Figure 9:
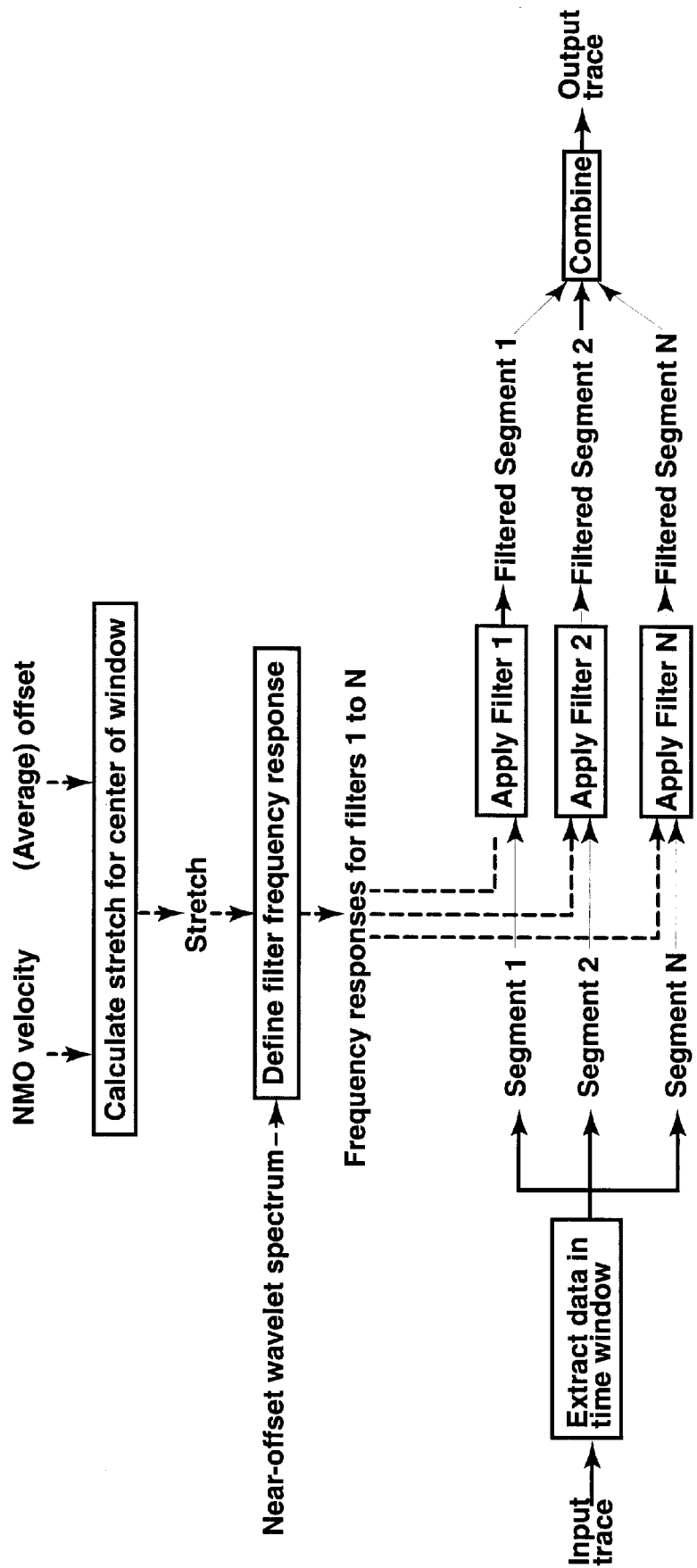
FIG. 9 is a flowchart illustrating the method for NMO stretch compensation.

FIGS. 7, 8, and 9 show how the NMO stretch compensation process is implemented to address the fact that the stretch factor varies with time and offset. FIG. 7 is a schematic illustrating the application of the time-variable NMO stretch compensation filter to an input seismic trace. The main idea is to extract from the input trace 701 a number of overlapping data segments 702. For each data segment 702 the value of the stretch factor β is supposed to be constant and equal to its value at the center of the segment. A filter response is then derived for this value of β, as described in the discussion of FIG. 5, and applied to the segment to produce a corresponding filtered segment 703. The process is repeated for all segments 702 with a different filter being applied to all segments 702. Finally, the filtered segments 703 are combined using linear interpolation to produce the output seismic trace 704.

FIG. 8 is a schematic illustrating this linear interpolation process. For a given output time, two neighboring filtered segments 801 are found such that their center times 802 bracket the output time 803. Then the output sample value a on the output trace 804 is linearly interpolated from the sample values a1 and a2 of the two segments 801 corresponding to the same time 803. The interpolation weights are derived from the time intervals dt1 and dt2 between the output data sample time 803 and the centers 802 of the filtered segments 801 that bracket it. The interpolation equation is:

$$a = a1*(dt2/dt) + a2*(dt1/dt), \quad (5)$$

where dt is the time interval between the segment centers 802.

For the process to work accurately, the time distance between successive segment centers should not be too large. For typical surface seismic frequencies, it should not be larger than approximately 100 milliseconds. On the other hand, if the distances between segments are very small (e.g. of the order of the sampling rate, typically 4 milliseconds) the process produces accurate results but is unnecessarily time-consuming. Additionally, very short segment lengths can lead to inaccurate results. Thus, for typical seismic frequencies, the segments should never be shorter than 200 milliseconds.

As discussed earlier, the frequency response of the NMO stretch compensation filter is defined based on the near-offset wavelet spectrum. The near-offset spectrum is preferably estimated from a near-offset stacked section rather than from pre-stack near-offset data, to take advantage of the signal-to-noise ratio improvement achieved by stacking. To estimate a reliable spectrum an estimation. window at least 1 second long is preferably used for typical seismic data frequencies.

Additionally, the spectrum should not be estimated from a single near-offset trace but from an ensemble containing a large number of adjacent traces. The number of traces is preferably at least 100 traces for robust estimation. The filter derived from this ensemble should then be applied to all the traces in the ensemble. Spectrum estimates derived from single traces tend to be unreliable and quite variable from trace to trace. Using such estimates would lead to NMO stretch compensation filters also significantly varying from trace to trace. When such filters are applied to the data they lead to artificial trace-to-trace variation in the output section that can cause erroneous geologic interpretation.

FIG. 9 is a flowchart illustrating the NMO stretch compensation method. This summarizes the method as covered in the discussion of FIGS. 5 and 7. Notice that the filter responses are calculated based on the near-offset wavelet spectrum, the NMO velocity function and the offset and not on the input trace data. The method can be applied to either pre-stack or post-stack seismic data. Stacking is the averaging of several traces to improve the signal-to-noise ratio and to reduce the data volume to a manageable size for further interpretation. In the post-stack case, the offset used for the calculation of stretch is taken to be the average offset of the traces contributing to the stack.

2. COMPENSATION FOR ABSORPTION AND OTHER FREQUENCY-DEPENDENT LOSSES

Figure 10A:
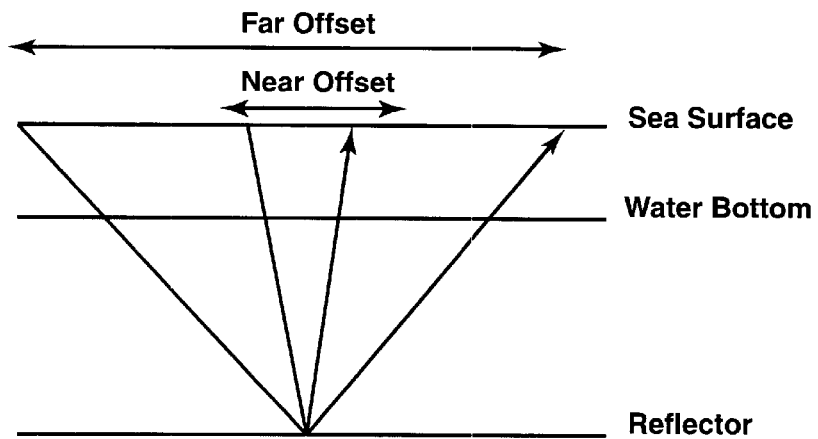
FIG. 10a is a schematic showing the different wave paths for near- and far-offset data.
Figure 10B:
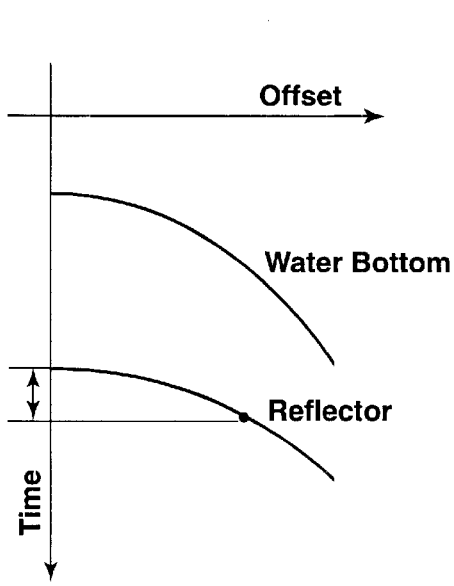
FIG. 10b is a schematic of a CDP gather illustrating the traveltime difference between near- and far-offset reflection times.
Figure 10C:
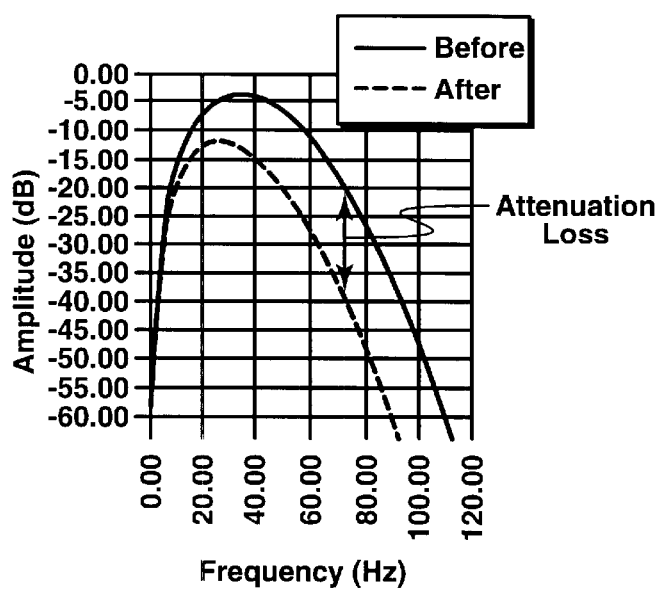
FIG. 10c is a diagram showing the effects of attenuation on the spectrum of the seismic pulse.

As seismic waves propagate in the sub-surface, a portion of the wave energy is transformed to heat and thus lost, causing attenuation of the wave amplitudes. Since the amount of attenuation depends on the length of the wave propagation path, far-offset amplitudes are attenuated more than the corresponding near-offset amplitudes. FIG. 10a is a schematic showing the different wave paths for near- and far-offset data. Additionally, since the attenuation effect is frequency-dependent, the bandwidths of the near- and far-offset wavelets are differently affected. FIG. 10c is a diagram showing the effects of attenuation on the spectrum of the seismic pulse. These attenuation effects will, if unaccounted for, significantly distort the AVO trends and invalidate the results of AVO analysis. Therefore, for accurate AVO analysis, it is desirable to apply corrections that approximately account for the effect of attenuation.

Occasionally other effects (such as source and receiver array directivity) are important and can be corrected by simply extending the method described here. Waveform spreading is typically corrected in the standard seismic data processing sequence. Compensation for interbed multiples and transmission effects are mentioned in Duren, R. E., 1992, "Range-equation weights for AVO", Geophysics, 57, 1203–1208. This is not recommended, however, because in an exploration setting there is very little information with which to estimate the magnitude of these effects.

A typical way to characterize attenuation is through the use of the quality factor Q. The quality factor is a property of the material through which the waves propagate and is defined in terms of the mean stored energy W and the energy loss ΔW during a single cycle of sinusoidal deformation. This is shown in O'Connell, R. J., and Budiansky, B., 1978, "Measures of dissipation in viscoelastic media", Geophys. Res, Lett., 5, 5–8 as $$Q = 4\pi W / \Delta W. \quad (6)$$

If Q is independent of frequency, it can be shown that the attenuation loss for a propagating wave can be expressed as an exponential decay as follows:

$$\text{Attenuation Loss} = \exp[-\pi f \int dt/Q(t)], \quad (7)$$

where f is the frequency and Q(t) is the quality factor that the wave encounters at time t; and the integral is a line integral along the path of the wave. Generalized versions of Equation (7) can be derived if Q is frequency dependent.

Standard Q-compensation methods attempt to compensate for all absorption losses since the waves entered the subsurface. Such methods are unstable, since they tend to amplify high-frequency noise. The Q-compensation approach adopted here only corrects for the relative amplitude loss between near and far offsets. This amounts to applying to the data a Q-compensation gain equal to $$Q - \text{Compensation Gain} = \exp\left[\pi f \left(\int_{far} dt/Q - \int_{near} dt/Q\right)\right], \quad (8)$$

where the line integrals are calculated along the far and near-offset ray paths. For a constant-Q subsurface the exponent of the Q-compensation gain is proportional to the traveltime difference between the near- and far-offset reflection times. FIG. 10b is a schematic of a CDP gather illustrating this traveltime difference. For standard full compensation, the exponent would be proportional to the total times the waves spend in the subsurface. Because the near-to-far traveltime differences are typically much smaller than the total subsurface traveltimes, the relative Q compensation represents a much smaller correction than the full compensation and, consequently, it causes much smaller amplification of high-frequency noise; for this reason, it typically produces much more reliable results than the ones produced with full compensation.

Figure 11:
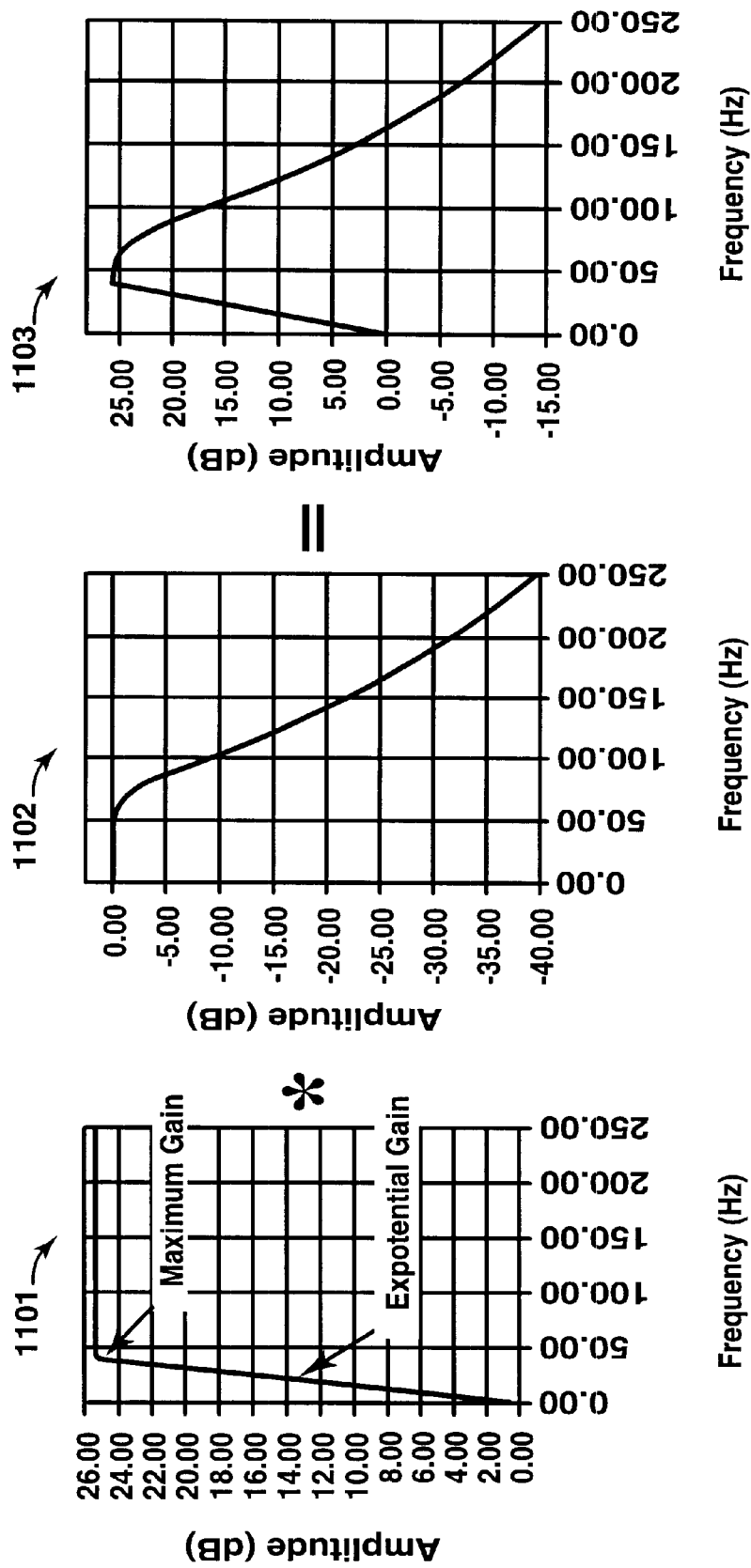
FIG. 11 is a schematic of diagrams showing the frequency response of the Q-compensation filter.

FIG. 11 is a schematic of diagrams showing the frequency response of the Q-compensation filter 1103. The filter is an exponential gain 1101 as a function of frequency, according to Equation (8). This appears as a straight line in the first filter 1101 of FIG. 11, because the vertical scale of the plot is logarithmic. After the exponential gain 1101 reaches a maximum allowed gain, it is limited to avoid excessive high-frequency noise amplification. Finally, the limited exponential gain 1101 is convolved with a low pass filter 1102 to ensure that the filter gain decreases back to small values in the high-frequency range. This generates the final Q-compensation filter 1103.

Note that the exponent of the Q-compensation filter 1103 is different for different offsets. It also changes as a function of time, since the time difference between near- and far-offset reflection times is also time-dependent. For this reason, the Q-compensation process is implemented in a way similar to the one introduced earlier for the NMO stretch compensation. A number of overlapping data segments are extracted from the input trace. The difference in attenuation losses between near and far offsets (and therefore the exponent of the Q-compensation filter) is calculated for the center of each segment and the corresponding filter response derived and applied to the segment to produce a corresponding filtered segment. After the process is repeated for all segments, the filtered segments are combined with linear interpolation, as in FIG. 8, to produce the output trace. The recommendations for the distance between segment centers and the length of the segments are the same as the ones given above for the NMO stretch compensation method.

Figure 12:
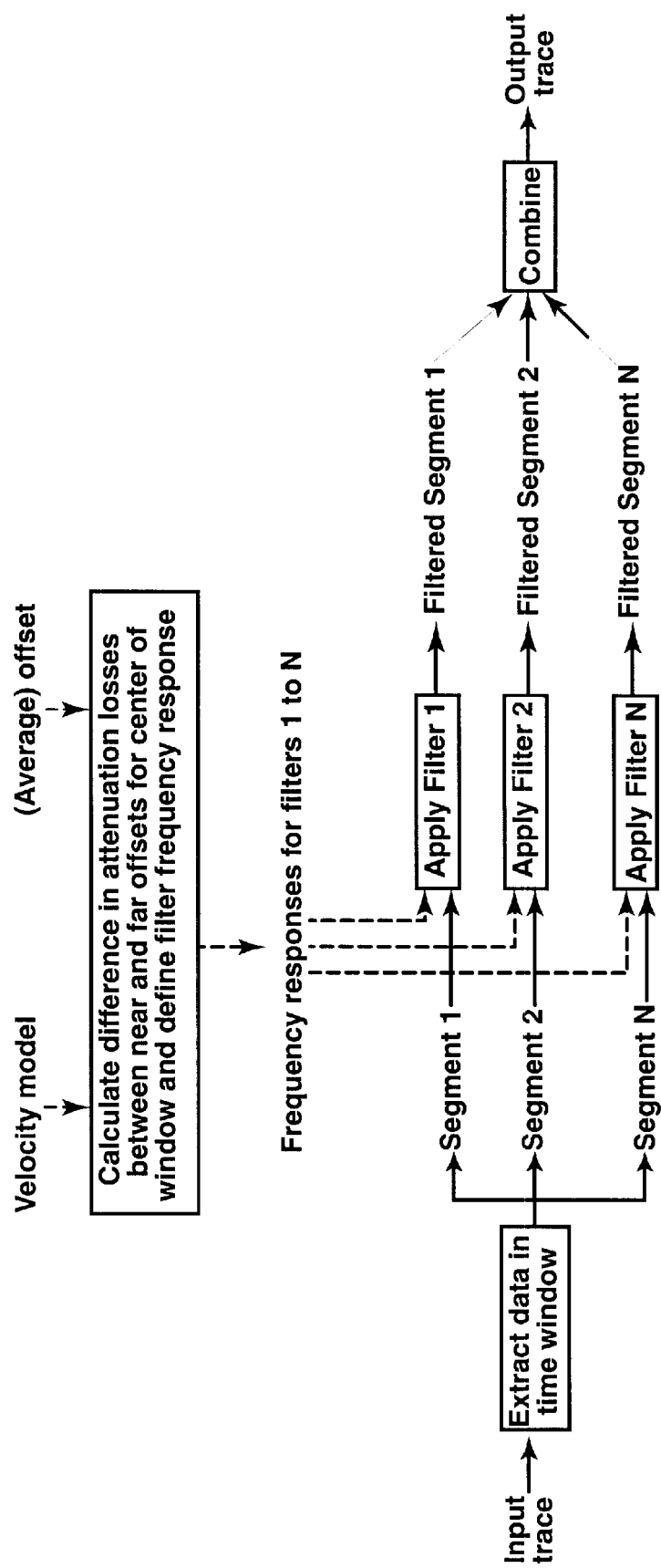
FIG. 12 is a flowchart illustrating the method for Q-compensation.

FIG. 12 is a flowchart illustrating the Q-compensation method. It is similar to the flowchart in FIG. 9. The velocity model (NMO or interval velocity) and the offset are necessary to determine the difference in attenuation losses between near- and far-offset data. Similar to the NMO stretch compensation method, the Q-compensation method can be applied to either pre-stack or post-stack seismic data. As before, in the post-stack case, the offset used for the calculation of the attenuation losses is taken to be the average offset of the traces contributing to the stack.

It is desirable that both NMO stretch and Q compensation be applied to the data. The NMO stretch compensation method will mostly balance the near- and far-offset spectra. It will, however, reduce the far-offset amplitudes and suppress the AVO effect, in the presence of absorption. In other words, the compensation may reduce the amount of amplitude increase with offset, or convert an amplitude increase into an amplitude decrease. The reason for this is that NMO stretch compensation turns the lower-frequency stretched far-offset wavelet into a higher-frequency one. Since higher frequencies suffer larger absorption effects, the unstretched wavelet will have lower amplitude than the original stretched wavelet, in the presence of attenuation.

Figures 13A, 13B, 13C:
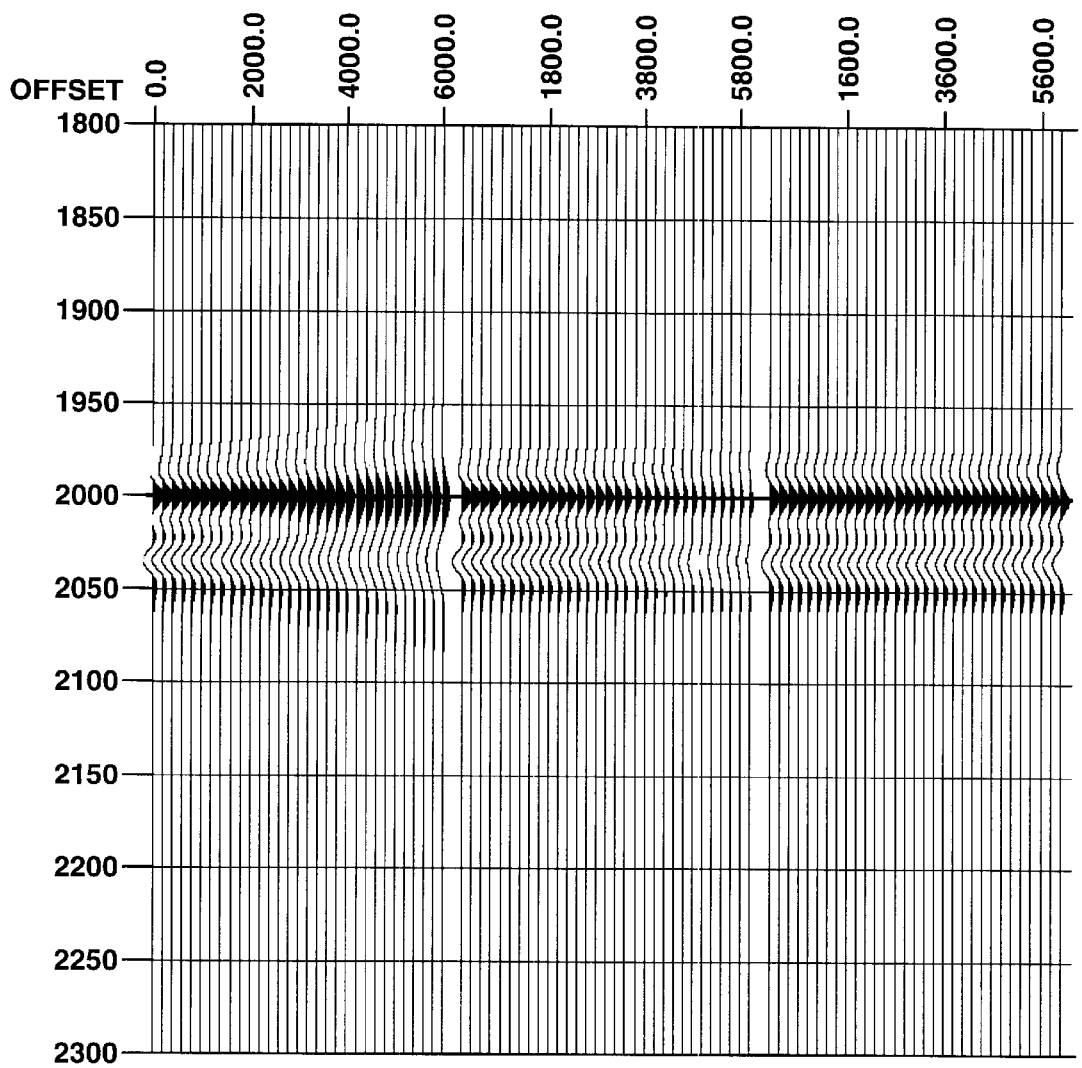
FIG. 13a is a synthetic CDP gather corresponding to a case of constant reflectivity versus offset.
FIG. 13b is the CDP gather of FIG. 13a showing the effect of NMO stretch compensation.
FIG. 13c is the CDP gather of FIG. 13a showing the effect of NMO stretch and Q compensations.

FIGS. 13a through 13c show a synthetic CDP example illustrating the effect of applying both NMO stretch and Q compensation. FIG. 13a shows a synthetic CDP gather corresponding to a case of constant reflectivity versus offset. The amplitudes in this gather should be constant, yet they are decreasing from near to far offsets (left to right), because of the effect of attenuation that was modeled here. Progressively lower frequencies are also seen in moving from the near to the far offsets, because of NMO stretch. FIG. 13b shows the result of applying only NMO stretch compensation to the CDP gather in FIG. 13a. Notice that, although the far-offset wavelet has been compressed, the amplitude decay from near to far offsets is even more pronounced than in the original gather. FIG. 13c shows the result of applying both NMO stretch compensation and Q compensation to the CDP gather in FIG. 13a. It is only after application of both compensations that the original constant reflectivity as a function of offset is recovered.

In addition to absorption losses, source and receiver array losses can also be substantial. Such effects are also more significant for far-offset and higher-frequency data and, therefore, more pronounced after NMO stretch compensation. Given an estimate of the array signatures, these effects can also be corrected using a scheme similar to the one used here for the NMO stretch and Q compensation (apply different filters to overlapping input data segments and combine the filtered segments to produce the output trace). Typically, array effects are only significant for relatively shallow targets.

Since higher-frequency energy attenuates faster, the spectrum of the seismic wavelet changes with time. For earlier times, the wavelet contains higher frequency energy than it does at later times. Since the Q-compensation of the invention only corrects for the differential loss between near- and far-offset data, it does not correct for the variation described here. This can be addressed by using several estimates of the wavelet spectrum. For instance, one can estimate an average wavelet spectrum for the data recorded between 0 and 1 seconds, another for the data recorded between 1 and 2 seconds and so on. The wavelet spectrum for any given time can then be derived by linearly interpolating the estimated spectra.

The most important parameter for the Q-compensation process is the value of the quality factor Q. The most reliable estimates of Q can be achieved from Vertical Seismic Profiling (VSP) data recorded at nearby well locations, using standard well-known estimation methods. If VSP data are not available, a Q value can be derived by comparing seismic wavelet spectra estimated at early recording times to those estimated at late recording times and using the well-known spectral-ratio method. Although Q, in general, varies vertically and laterally, such variation is difficult to reliably estimate from seismic and well observations. Thus, the use of simple Q models is generally recommended. Assuming a highly-detailed Q model for the earth can lead to artificial amplitude variation in the resulting Q-compensated data, if the detailed features of the model are not accurate.

The order of the NMO stretch and Q compensation processes can be interchanged without producing any difference in the final results. Both processes can be applied to pre-stack data, which are then stacked for interpretation, or directly to the stacks. For typical offset ranges used for near- and far-offset stacks, our tests indicated that pre-stack and post-stack applications produce identical results. Since, after stacking, the data volume is significantly reduced, post-stack application is much less time-consuming and, therefore, recommended. Pre-stack application is necessary though when interpretation is performed in CDP gathers, or when the range of offsets used in the stack is very wide; in the latter case, the filter derived for the average offset can not effectively approximate the variety of filter responses corresponding to the different offsets being stacked.

3. EXAMPLES

Figure 2:
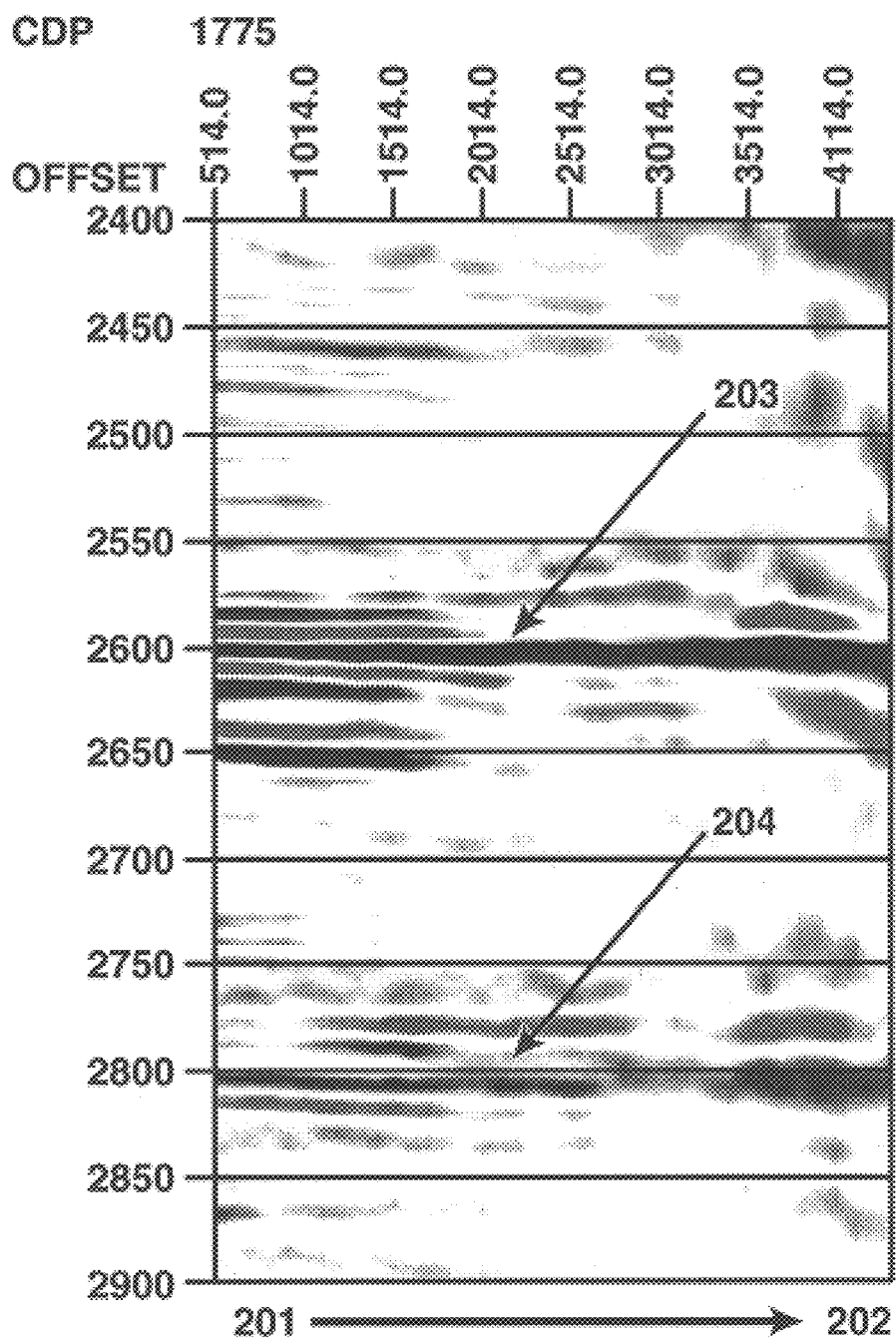
FIG. 2 is a comparison of change in frequency spectra between near- and far-offset sections in a CDP gather.
Figures 14A, 14B:
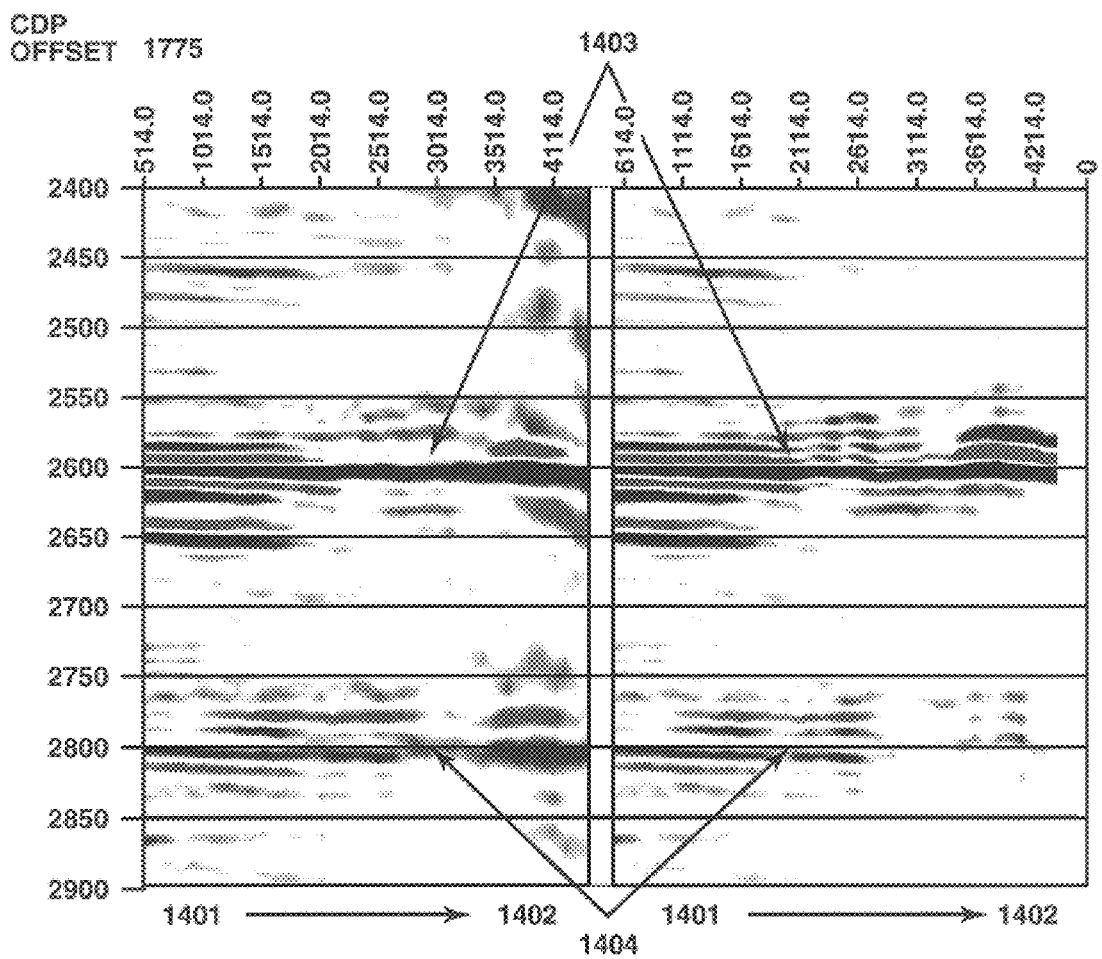
FIG. 14a shows the CDP gather of FIG. 2 before application of the spectral balancing method.
FIG. 14b shows the CDP gather of FIG. 14a after application of the spectral balancing method.

FIGS. 14a and 14b show a CDP gather before and after, respectively, application of the spectral balancing method of the invention. FIG. 14a is the same gather that was shown in FIG. 2, repeated here for comparison. On the original gather, FIG. 14a, there are several cycles that can be observed in the near offsets 1401, which then get lost, or coalesce with other cycles, in moving towards the far offsets 1402. These cycles are restored after application of NMO stretch and Q compensation, as can be seen in the gather in FIG. 14b. Examples of this are shown in the two areas marked by reference numbers 1403 and 1404.

Figure 1:
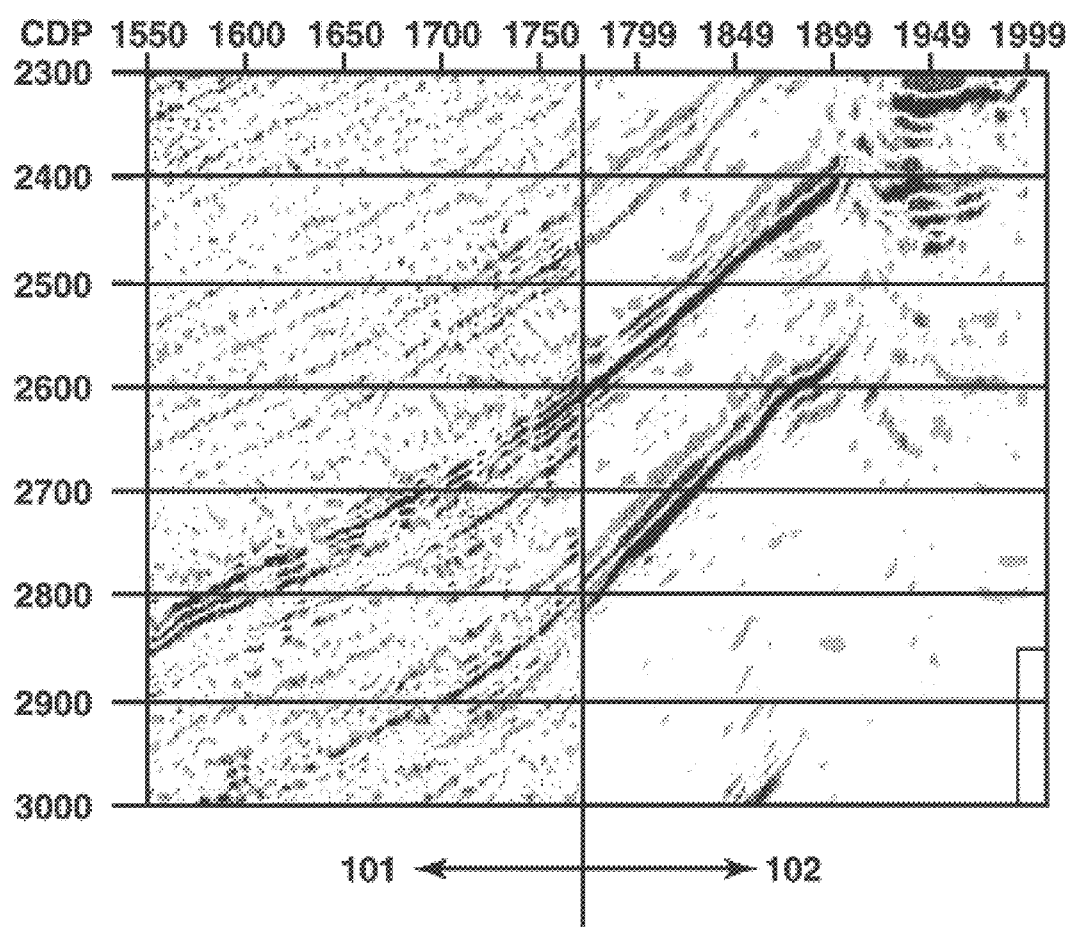
FIG. 1 is a comparison of change in frequency spectra between near- and far-offset sections.
Figure 15A:
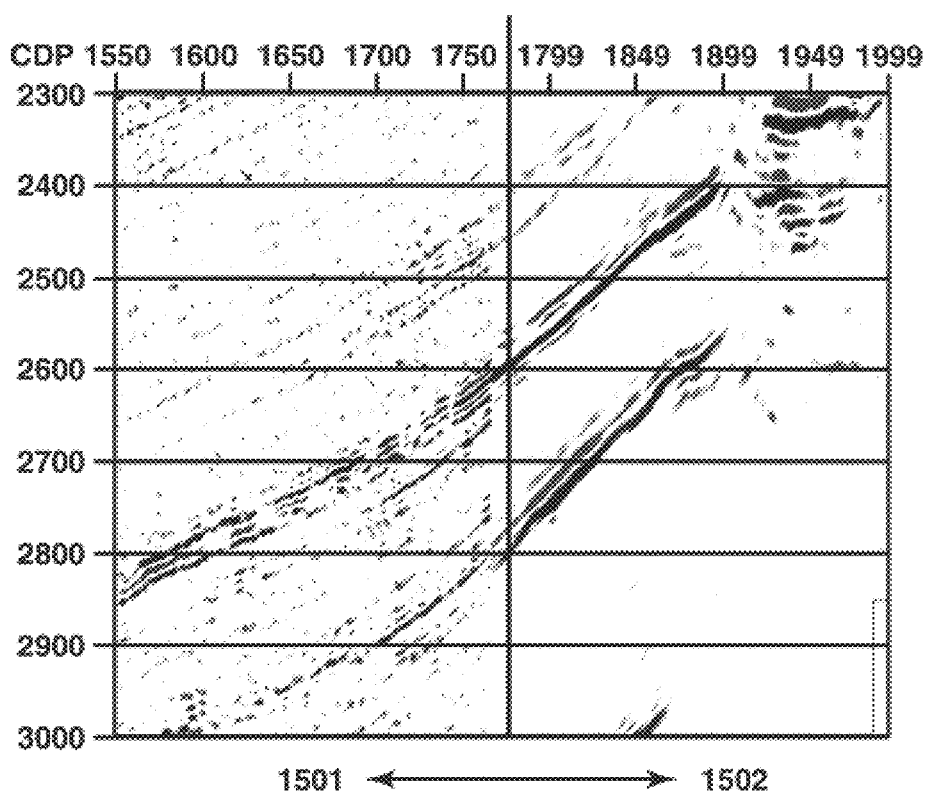
FIG. 15a is the near- and far-offset sections of FIG. 1 before application of the spectral balancing method.
Figure 15B:
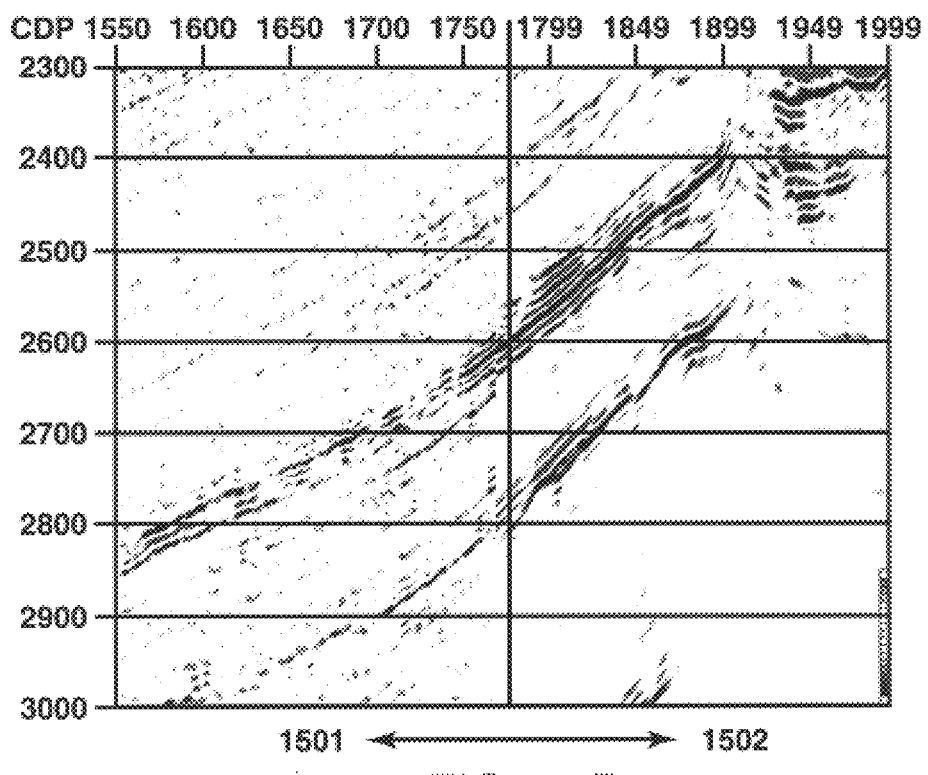
FIG. 15b is the near- and far-offset sections of FIG. 15a after application of the spectral balancing method.
Figure 16A:
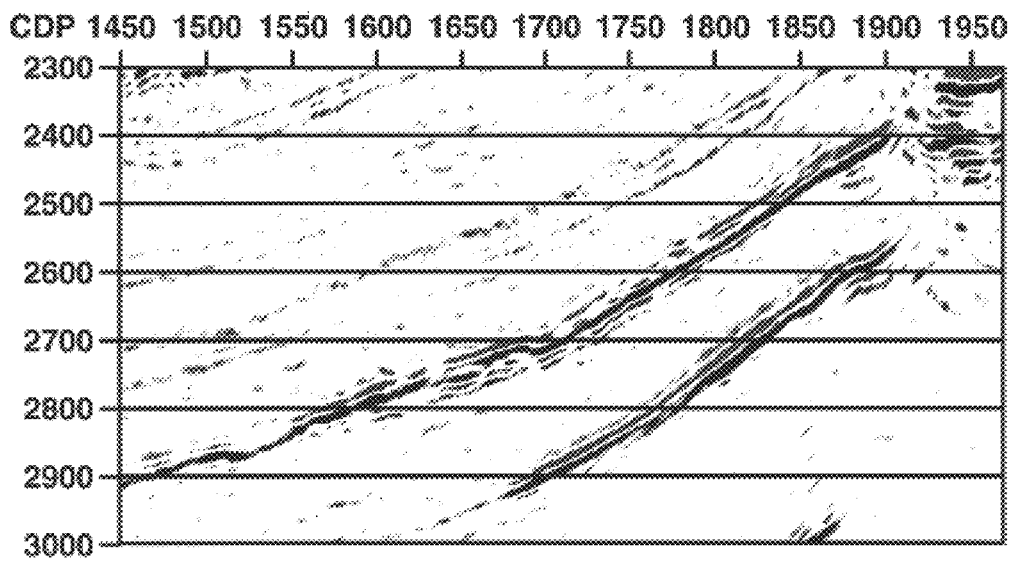
FIG. 16a is part of the far-offset sections of FIGS. 15a and 15b.
Figure 16B:
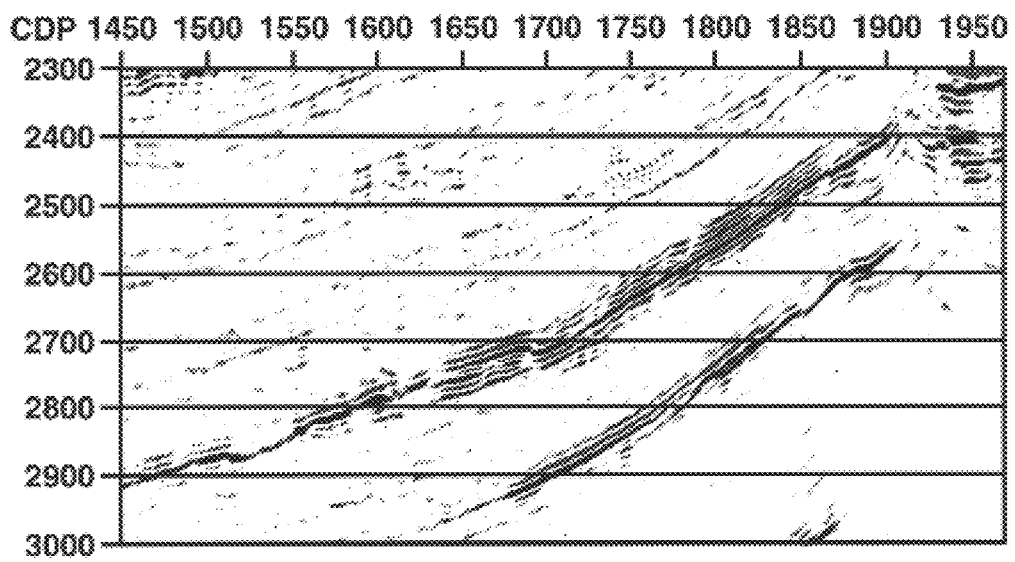
FIG. 16b is the far-offset sections of FIG. 16a after application of the spectral balancing method.

FIGS. 15a and 15b show a comparison of near-offset sections 1501 and far-offset stacked sections 1502 before and after, respectively, the application of the spectral balancing method of the invention. FIG. 15a is the same view of sections as in FIG. 1, repeated here for comparison. In FIG. 15b, after application of the method, the character of the near-offset sections 1501 and far-offset sections 1502 is much more similar and reflection events can be unambiguously identified on both. FIGS. 16a and 16b compare the original far-offset stack to the one produced after application of both NMO stretch and Q compensation. Resolution of this section clearly improved, becoming similar to that of the near-offset section.

Most of the changes in character observed in the previous examples are caused by the application of NMO stretch compensation. As mentioned before, the effect of relative Q compensation on the wavelet spectra is subtle. Yet, Q compensation has a large effect on the relative amplitudes of the near and far offsets, and, therefore, its application is very significant for correct AVO analysis. An example of Q compensation is shown in FIGS. 17a and 17b. In FIG. 17a, before Q compensation, the events around 2600 milliseconds 1703 show a decrease in amplitude with increasing offset from near offset 1701 to far offset 1702. In FIG. 17b, after Q compensation, the amplitudes of the same events 1704 are increasing with offset. The gather shown here is adjacent to a drilled well. Seismic modeling based on the recorded well logs indicated that an increase in amplitude versus offset should be observed on the seismic data. It is only after the application of Q compensation that the correct AVO trend is recovered.

4. CONCLUSION

Implementation of the invention can greatly benefit AVO analysis, for at least the following reasons. The vertical resolution of far-offset sections will improve and become more similar to that of the near-offset sections. Joint interpretation and comparison of near- and far-offset sections will be simpler and more accurate. Additionally, the overprint of offset-dependent tuning and frequency-dependent losses on the estimated AVO responses will be removed. Therefore, the extracted AVO attributes can be expected to more accurately represent the underlying variation of reflectivity as a function of offset.

It should be understood that the preceding is merely a detailed description of specific embodiments of this invention and that numerous changes to the disclosed embodiments can be made in accordance with this disclosure without departing from the scope of the invention. The preceding description, therefore, is not meant to limit the scope of the invention. Rather the scope of the invention is to be determined only by the appended claims and their equivalents.

I claim:

1. A method for spectral balancing of near- and far-offset seismic data, comprising:

determining velocity for the seismic data;

determining offsets for the seismic data;

creating an NMO stretch compensation filter by the following steps:

estimating a frequency spectrum of the near-offset seismic data;

calculating a stretch factor $\beta$ for the frequency spectrum of near-offset seismic data, using the velocity and the offsets;

calculating a stretched frequency spectrum of near-offset seismic data, based on the stretch factor $\beta$;

dividing the frequency spectrum of near-offset seismic data by the stretched frequency spectrum of near-offset seismic data, generating a first frequency response filter;

limiting high frequency gain in the first frequency response filter, generating a first gain-limited filter; and convolving the first gain-limited filter with a low pass filter, generating the NMO stretch compensation filter;

applying the NMO stretch compensation filter to the seismic data;

creating a relative Q compensation filter by the following steps:

calculating a difference in amplitude loss between the near- and far-offset seismic data, using the velocity and the offsets;

calculating a frequency gain, based on the difference in amplitude loss;

creating a second frequency response filter, based on the frequency gain;

limiting high frequency gain in the second frequency response filter, generating a second gain-limited filter; and convolving the second gain-limited filter with a low pass filter, generating the relative Q compensation filter; and applying the relative Q compensation filter to the seismic data.

2. The method of claim 1, wherein the seismic data is from a stacked section.

3. The method of claim 2, wherein the offset is the average of the offsets of the seismic traces in the stacked section.

4. The method of claim 1, wherein the frequency spectrum is estimated in a window of duration approximately equal to or greater than one second.

5. The method of claim 1, wherein the frequency spectrum is estimated from a selection of adjacent seismic traces of number approximately equal to or greater than 100.

6. The method of claim 1, wherein the step of applying the compensation filter to the seismic data comprises:

selecting a seismic trace from the seismic data, generating an input trace;

extracting a plurality of overlapping data segments from the input trace;

deriving the compensation filter corresponding to the velocity and offset at the center of each data segment, generating a plurality of corresponding segment filters;

applying the segment filter to the corresponding segments, generating a plurality of corresponding filtered segments;

combining the filtered segments by linear interpolation, generating an output trace; and repeating the preceding steps for each seismic trace from the seismic data.

7. The method of claim 6, wherein the step of combining the filtered segments by linear interpolation comprises:

selecting a time t on the output trace;

selecting a first filtered segment wherein the time t1 at the center is greater than the time t;

selecting a second filtered segment wherein the time t2 at the center is less than the time t;

determining the seismic data value a1 at the center time t1;

determining the seismic data value a2 at the center time t2;

measuring the time interval dt1=t1−t;

measuring the time interval dt2=t−t2;

measuring the time interval dt=t1−t2;

calculating the output sample value a at time t by the following equation:

$$a=a1*(dt2/dt)+a2*(dt1/dt);$$

and repeating the preceding steps for each time t on the output trace.

8. The method of claim 7, wherein the first and second filtered segments are derived from neighboring traces in the plurality of overlapping data segments.

9. The method of claim 6, wherein the length of the data segments is approximately equal to or greater than 200 milliseconds.

10. The method of claim 6, wherein the interval between the centers of neighboring data segments is approximately equal to or greater than 4 milliseconds and approximately equal to or less than 100 milliseconds.

* * * * *